United States Patent [19]

Simpson

[11] 4,010,457
[45] Mar. 1, 1977

[54] OVERLOAD PROTECTION DEVICE

[76] Inventor: Bobby Rollene Simpson, 915 Chippewa, Anaheim, Calif. 92801

[22] Filed: Mar. 17, 1975

[21] Appl. No.: 559,162

[52] U.S. Cl. .......................... 340/253 A; 340/248 C
[51] Int. Cl.² .......................................... G08B 21/00
[58] Field of Search .......... 340/248 R, 248, 253 R, 340/253 A; 317/22, 33 SC; 307/131

[56] References Cited

UNITED STATES PATENTS 1,699,782  1/1929  Erickson ....................... 340/253 A Primary Examiner—John W. Caldwell
Assistant Examiner—Daniel Myer
Attorney, Agent, or Firm—Fulwider, Patton, Rieber, Lee & Utecht

[57] ABSTRACT

A current overload protection device adapted for use in a system sequentially connecting a plurality of selected loads to a common source of excitation, said protection device opening the common circuit during those times when a shorted load is on the circuit. In order to provide indication subsequent to the selection of the shorted load, the device includes a latching relay activating an alarm which will therefore stay on after other properly operating loads are selected. The device comprises a current protecting relay having the coil thereof connected in series with a triac, and a current sensing resistor connected in series with one of the switches of the protection relay forming a circuit across the triac and the coil series. One other switch of the protecting relay, when pulled in, completes the circuit to the latching relay which energizes an alarm. The pull-in action of the protecting relay is controlled by the voltage developed across the current sensing resistor which therefore sets the voltage levels across the triac. The gating of the triac is accomplished by a two-directional diode connected to the protected lead of the circuit.

8 Claims, 1 Drawing Figure

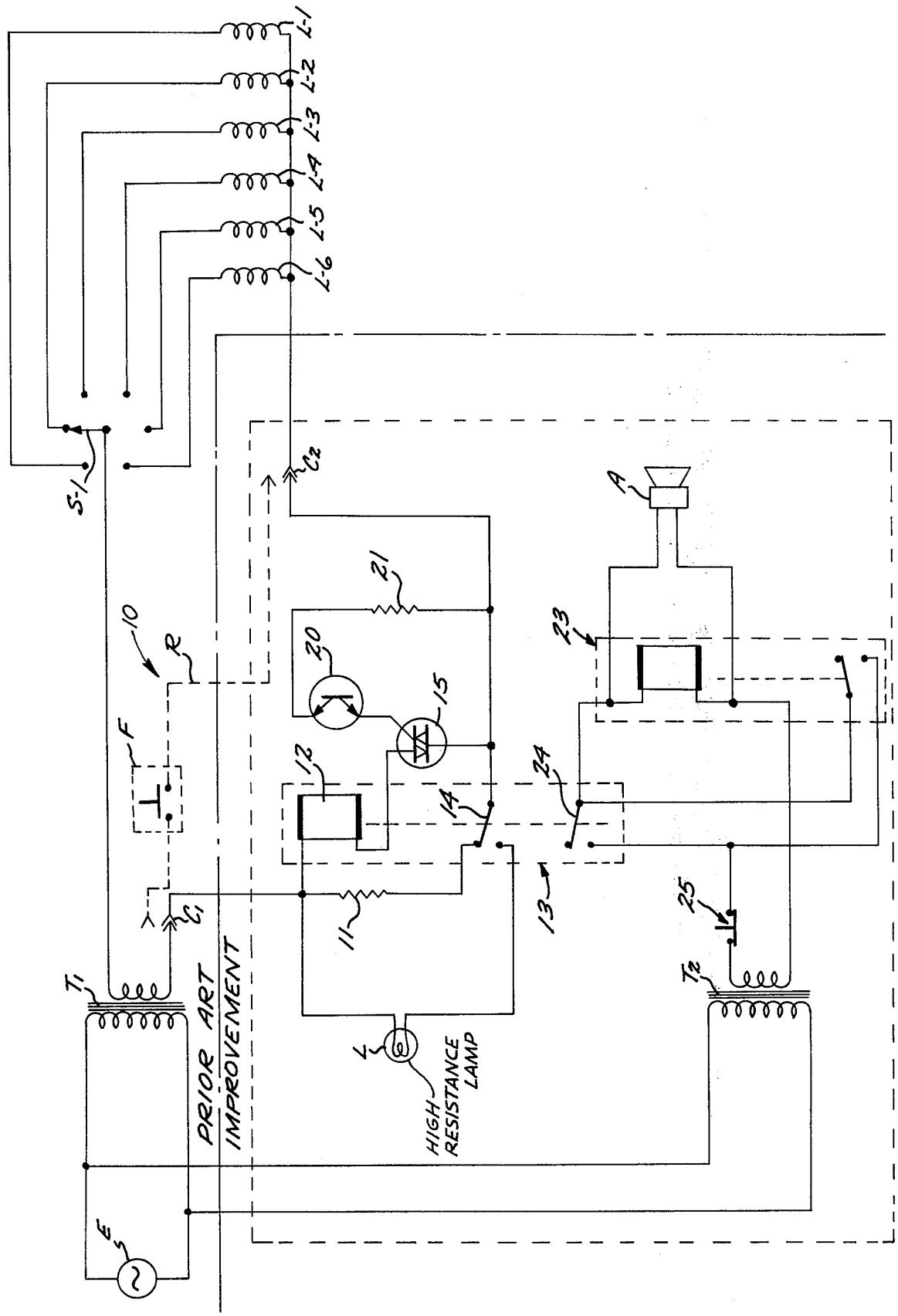

OVERLOAD PROTECTION DEVICE

BACKGROUND OF THE INVENTION

1. Field of the Invention

The present invention relates to circuit protection devices, and more particularly to devices which during a current overload in the circuit are tripped to remove the load from the line.

2. Description of the Prior Art

In many installations, various loads are sequentially selected to connect to a common power source in order to operate various devices in a particular predetermined sequence. One example of such installation is a remotely controlled irrigation system where a plurality of sequentially selected solenoids control various valves which in turn selectively direct the flow of water to various areas to be irrigated. Where the irrigated area is large, such as a golf course, visual inspection of each valve in conjunction with the status of the controlling selector selecting such valve for operation is difficult. This difficulty in visual diagnosis prevents the isolation of the shorted solenoid. Furthermore, in typical prior art systems of this kind, all solenoids controlling the various valves are typically protected by single fuse or circuit breaker. The disadvantages of the fuse or circuit breaker are that once any of the solenoids has failed the common circuit is opened and all subsequently selected solenoids are therefore connected to an open line. This fusing arrangement renders diagnosis of the system more difficult since only constant monitoring of the circuit breaker or fuse in conjunction with the selector will allow discovery of the faulty load.

Thus, most prior art protection devices do not lend themselves to convenient diagnoses of the failure modes of a large sequential system, nor do the prior art devices provide selective circuit protection which opens the circuit only during the overloaded period.

SUMMARY OF THE INVENTION

Accordingly, it is the general purpose and object of the present invention to provide an overload protection device which isolates the circuit only during those times when the current load thereacross exceeds a predetermined level.

Further objects of the invention are to provide a current protection device which includes indicating means in the form of a latch, for indicating the past occurrence of an overload.

Yet further objects of the invention are to provide a current protection device which is easy to produce, convenient to maintain, and which furthermore provides visual indication of a temporary short.

These and other objects are accomplished within the present invention by providing a current sensing resistor connected across a coil of a relay series connected with a triac. The circuit including the relay coil and the triac is disposed in the common return line from a plurality of selected loads, with the current sensing resistor forming a parallel circuit thereacross through one of the switches of the relay. The triac is gated by a circuit from the common return line including a resistor in series with a two-directional diode, or diac, and will therefore conduct only if the voltage across the triac, and therefore across the current sensing resistor, exceeds the breakdown level of the diac.

Thus, two parallel return paths are formed, one across the normally closed switch of the relay in series with the current sensing resistor and the other through the triac and the relay coil. When a current overload appears across the sensing resistor to develop a voltage potential greater than the breakdown level of the diac, the relay coil is excited pulling in the switch to its other state where it completes a circuit to an indicating light. The resistance of the sensing resistor and the breakdown level of the diac in circuit with a triggering resistor therefore set the switching current level or the overload current pulling in the relay. When pulled in, most of the current drop occurs across the light and the rest of the circuit, or the protected part of the circuit, is therefore essentially unloaded.

Ganged together with the above relay switch is yet another switch aligned to a normally open position and articulated by the coil to close the circuit to a latching relay in series with an audio alarm. Thus when an overload is sensed, the alarm is latched on and will only be unlatched by a manual push-to-open switch, providing an indication of a past overload.

In this manner, a temporary short will automatically take the load off the line until the next load is selected. During the selection of the next load, the triac is reset, resetting the relay and allowing the circuit to close, connecting the newly selected load to the source. The alarm, however, will stay on until reset.

By way of this device, a periodically occurring short will trigger the protection relay to open the circuit during the duration of the short. When the shorted load is removed from the circuit, the triggering levels of the triac are no longer met and the circuit will then switch back to a closed state.

BRIEF DESCRIPTION OF THE DRAWINGS

The FIGURE illustrates a circuit schematic embodying both a prior art device and the inventive device connected in substitution therefor.

DESCRIPTION OF THE SPECIFIC EMBODIMENT

While the present invention is described in conjunction with a circuit including a plurality of loads selected by a stepping switch, such is for purposes of description only. It is to be understood that other temporarily occurring shorts can be accommodated by the presently disclosed protection device, whether such shorts are brought onto the line as result of a stepping switch selection or by other load selection techniques.

As shown in the FIGURE, a typical plural load system includes a conventional source of alternating power E connected across the primary of a first dropping transformer T1, which conventionally reduces the potential across the secondary thereof to a safe level, such as 24 volts. The secondary of transformer T1, at one end thereof, then connects to a selector switch S1, which by virtue of its position excites one out of a plurality of loads shown herein as loads L1–L6. Loads L1–L6 connect on the other end thereof to a common return line R conventionally protected by a circuit breaker or fuse F completing the circuit to the return side of the secondary of transformer T1. Thus as the selector switch S1 is advanced to bring the various loads L1–L6 onto the line, the current level through each load is monitored by the prior art fuse or circuit breaker F. Should any one of the loads exceed the fusing or the tripping level of the circuit breaker F, the circuit breaker or the fuse is rendered opened by conventional means, opening the circuit for all subsequently selected loads. Accordingly, the prior art system described herein will be disabled on the first instance of a current exceedance, thus rendering all other subsequently selected functions inoperative until reset by an operator.

In automatic irrigation facilities in particular, maintenance of continued irrigation is quite critical, and where automatic operation is relied upon it is desired that only a minimum amount of irrigation, or a minimal area be unirrigated, in case of a short. The conventional prior art system described above, on the other hand, either exposes a potentially large area to loss of irrigation or requires continual monitoring by an operator over the status of the circuit breaker. This undesirable alternative is avoided by the inventive circuit protection device described herein connected in substitution for the circuit breaker F.

To illustrate this substituting connection, the return lead R section including the prior art circuit breaker F is shown in dotted line, disconnected from connections C1 and C2 thereof. Connected between connections C1 and C2, in substitution for the fuse, is the inventive device, generally designated herein by the numeral 10. Within the device 10 the return side of the secondary of transformer T1 is connected, across connection C1, to one end of a current sensing resistor 11 disposed in parallel across a coil 12 of a switching relay generally shown as relay 13. The other end of the coil 12 connects in series with a triac 15 while the other end of resistor 11 completes a parallel circuit thereacross through a switch 14 articulated by the coil 12. Switch 14 thus normally provides a return path across resistor 11 between the connections C1 and C2. Switch 14, when pulled in by coil 12, articulates to the other position where it completes a circuit including an indicating light L across connections C1 and C2.

The pull-in action of coil 12 is controlled by the conduction of the triac 15. Triac 15 includes in its gate leg a two-directional diode, or diac, 20 in series with a resistor 21 completing the circuit to connection C2. Thus as the voltage developed across triac 15 by virtue of the voltage across current sensing resistor 11 exceeds the breakover levels of the diac 20, the triac 15 is rendered conductive, pulling in switch 14 to complete the circuit including the indicating light L. The resistance of the indicating light L being much greater than the resistance of the sensing resistor 11 then essentially decouples the load from the line while at the same time providing a large potential across the triac to maintain relay 13 latched on. As the switch S1 progresses to the next load, a momentary open circuit condition is achieved whereby the triac 15 and the relay 13 are unlatched.

Accordingly, while the load selected is drawing more than the designed current through the circuit the triac 15 will maintain switch 14 latched to complete the circuit across the indicating light L. When the switch S1 translates to the next load, the triac 15 is unlatched if the next load is within the current draw limits.

In order to provide an indication of the past occurrence of an overload, relay 13 includes a switch 24 ganged with switch 14 to an open position when switch 14 completes the circuit including resistor 11. When switch 14 is pulled in, switch 24 is articulated to its other state. In its other state, switch 24 completes a circuit across the secondary of yet another transformer T2 to an alarm circuit, shown herein as an audio alarm, A. Connected across the alarm circuit A is a latching relay 23 having a switch thereof connected in parallel across switch 24. Thus once switch 14 is pulled in, latching relay 23 will maintain a parallel circuit across switch 24 which will stay closed even though switch 14 and switch 24 are released. In order to reset the alarm, a manual push-to-open switch 25 is provided in circuit between, or with the secondary of transformer T2, which when pushed to open will disconnect the latching relay 23 allowing the switch thereof to articulate to an open position. The primary of transformer T2 is similarly connected to the source E for excitation.

By way of the foregoing description, an inventive device is shown which responds to an overload condition in the line. Once the overload condition is removed from the line, the protective device unlatches automatically, providing excitation to the subsequently selected loads. Since such action will not provide a convenient indication to any operator of a past short, a latching circuit is provided which will stay on to indicate the former short but which has no effect on the subsequent operation of the circuit.

Obviously, many modifications and variations of the present invention may be made with regard to the foregoing detailed description without departing from the spirit of the invention.

I claim:

1. A circuit protection device for a circuit that includes a plurality of loads alternatively selectable and connectable to a lead of said circuit comprising:
   a selector switch in one of said leads for selectively and alternatively connecting said loads into said circuit and opening said circuit to effect change of the load connected therein;
   sensing means connected in one of said leads of said circuit for sensing the current drawn therethrough and developing an electrical potential indicative thereof;
   relay means connected in parallel across said sensing means and conductive when said electrical potential thereacross exceeds a predetermined amplitude;
   a high resistance likewise connected in parallel with said sensing means;
   a first switch having first and second contacts disposed with said first contact in series with said sensing means and said second contact in series with said high resistance, whereby said first switch is operable under the control of said relay means to break the circuit through said sensing means while said relay means is rendered conductive during which condition said first switch establishes a circuit path through said high resistance and said second contact;
   an alarm circuit having an alarm mechanism and having a second switch disposed therein for dependent operation with said first switch under the control of said relay means whereby said second switch is opened when said first switch conducts through said sensing means and is closed when said first switch conducts through said high resistance;
   latching means associated with said second switch for latching said second switch into a conductive mode upon closure of said second switch to maintain said alarm circuit in a conductive state; and
   reset means for manually resetting said latching means.

2. Apparatus according to claim 1 wherein:
   said relay means includes a coil in series with a triac and a two-directional diode connected between the gate terminal of said triac and the aforesaid one of said leads.

3. Apparatus according to claim 2 wherein said latching means includes a latching relay connected in said alarm circuit with said second switch and providing a parallel latching switch thereacross, and said resetting means is a reset switch disposed for manual operation for disengaging said latching relay.

4. Apparatus according to claim 3 further characterized in that:
said high resistance is an indicating means connected in parallel with said sensing means for providing a visual indication when said first switch is operated to form an electrical connection through said second contact.

5. Apparatus according to claim 1 wherein said latching means includes a latching relay connected in said alarm circuit with said second switch and providing a parallel latching switch thereacross, and said reset means is a reset switch disposed for manual operation for disengaging said latching relay.

6. In an electrical circuit including a plurality of loads for alternative connection into said circuit, the improvement comprising:
a selector switch for disconnecting a load and connecting another load in said circuit;
sensing means connected in said circuit for detecting the current therethrough and developing a potential thereacross indicative of the magnitude of said current;
relay means associated with said sensing means and operative at a predetermined magnitude of said potential;
high resistance means connected in parallel with said sensing means;
first switching means having first and second contacts and disposed with a first contact in series with said sensing means and with a second contact in series with said high resistance means, whereby said first switching means is operable under the control of said relay means;
an alarm circuit equipped with an alarm mechanism and having a second switching means disposed in said alarm circuit for concurrent operation in tandem with said first switching means, whereby said second switching means is open when said first switching means conducts through said sensing means and closed when said first switching means conducts through said high resistance means;
latching means operated by said second switching means in said alarm circuit for holding said second switching means in a conductive position thereby maintaining an alarm closure of said second switching means; and
reset means for manually resetting said latching means.

7. Apparatus according to claim 6 wherein:
said relay means includes a coil in series with a triac and a two-directional diode connected between the gate terminal of said triac and the output thereof.

8. Apparatus according to claim 6 further characterized in that:
said high resistance is an indicating means connected in parallel with said sensing means for providing a visual indication when said first switch is operated to form an electrical connection through said second contact.

* * * * *